US012125461B2

(12) United States Patent
Tsuge

(10) Patent No.: US 12,125,461 B2
(45) Date of Patent: Oct. 22, 2024

(54) ACTUATOR FOR PIANO, AND PIANO

(71) Applicant: YAMAHA CORPORATION, Hamamatsu (JP)

(72) Inventor: Yoshiyuki Tsuge, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 227 days.

(21) Appl. No.: 17/723,617

(22) Filed: Apr. 19, 2022

(65) Prior Publication Data

US 2022/0238084 A1 Jul. 28, 2022

Related U.S. Application Data

(63) Continuation of application No. PCT/JP2019/044498, filed on Nov. 13, 2019.

(51) Int. Cl.
*G10D 3/06* (2020.01)
*G10C 3/06* (2006.01)

(52) U.S. Cl.
CPC ...................................... *G10C 3/06* (2013.01)

(58) Field of Classification Search
CPC ............... G10C 3/06; G10C 1/00; G10C 3/04
See application file for complete search history.

(56) References Cited

U.S. PATENT DOCUMENTS 9,035,164 B2 * 5/2015 Ohnishi .................. G10H 1/32
84/744
2018/0254031 A1 9/2018 Katayama

FOREIGN PATENT DOCUMENTS

JP H04500735 A 2/1992
WO 2017046843 A1 3/2017

OTHER PUBLICATIONS

International Search Report issued in Intl. Appln. No. PCT/JP2019/044498 mailed Feb. 4, 2020. English translation provided.
Written Opinion issued in Intl. Appln. No. PCT/JP2019/044498 mailed Feb. 4, 2020.
English translation of Written Opinion issued in Intl. Appln. No. PCT/JP2019/044498 mailed Feb. 4, 2020, previously cited in IDS filed Apr. 19, 2022.

* cited by examiner

*Primary Examiner* — Kimberly R Lockett
(74) *Attorney, Agent, or Firm* — ROSSI, KIMMS & McDOWELL LLP

(57) ABSTRACT

An actuator is used for a piano includes a bridge and strings. The actuator includes: a vibrating body; and an attachment portion configured to attach the vibrating body to the piano, the attachment portion being configured to be sandwiched between the bridge and at least one string, among the strings of the piano.

14 Claims, 4 Drawing Sheets

ACTUATOR FOR PIANO, AND PIANO

CROSS-REFERENCE TO RELATED APPLICATIONS

The present application is a continuation application of International Application No. PCT/JP2019/044498, filed Nov. 13, 2019. The content of the application is incorporated herein by reference.

FIELD OF THE INVENTION

The present disclosure relates to an actuator for a piano, and a piano.

DESCRIPTION OF RELATED ART

Published Japanese Translation No. H04-500735 of the PCT International Publication (hereinafter Patent Document 1) discloses an actuator for a piano that produces a sound by vibrating the soundboard of the piano. In the piano of Patent Document 1, a part of a transmission unit (drive hammer) coupled to a vibrating body of an actuator for a piano is embedded or fixed inside the bridge of the piano to be attached to the bridge of the piano.

SUMMARY OF THE INVENTION

However, as in Patent Document 1, when a section of the actuator for a piano is to be embedded or fixed in the bridge of the piano, it is necessary to perform processing on a component of the piano such as the bridge or use an adhesive. For that reason, there is a problem that it is troublesome to attach/detach the actuator for a piano to/from the piano.

It is also not preferable to perform processing or use adhesive on a component of a piano to attach the actuator for a piano to the piano since doing so may damage components of the piano.

The present disclosure has been made in view of the above circumstances, and an object of the present disclosure is to provide an actuator for a piano that can be easily attached to and detached from the piano without processing and without using an adhesive, and a piano including the actuator for a piano.

According to a first aspect of the present disclosure, there is provided an actuator for a piano including a bridge and strings. The actuator includes: a vibrating body; and an attachment portion configured to attach the vibrating body to the piano, the attachment portion being configured to be sandwiched between the bridge and at least one string, among the strings of the piano.

According to a second aspect of the present disclosure, there is provided a piano including: a bridge; strings; and an actuator including: a vibrating body; and an attachment portion that attaches the vibrating body to the piano, the attachment portion being sandwiched between the bridge and at least one string, among the strings.

EMBODIMENTS FOR CARRYING OUT THE INVENTION

Hereinbelow, embodiments of the present disclosure will be described with reference to FIGS. 1 to 6.

Figure 1:
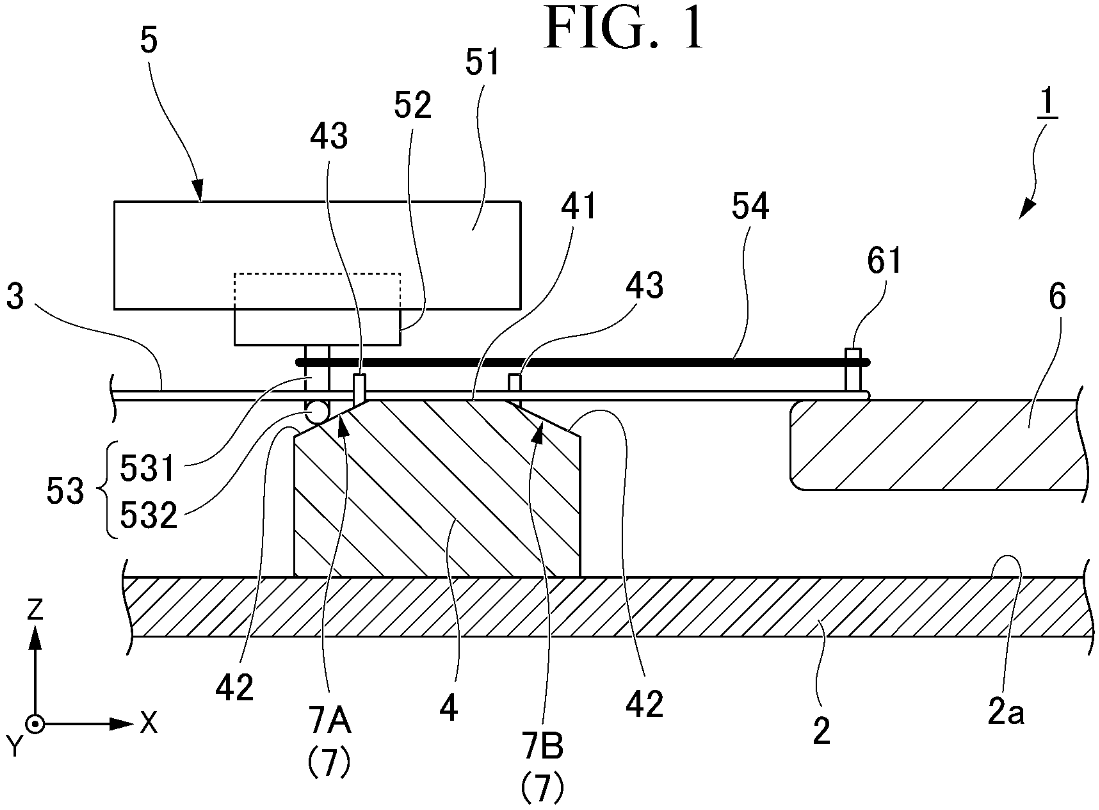
FIG. 1 is a cross-sectional view showing essential portions of a piano including an actuator for a piano according to an embodiment of the present disclosure.

As shown in FIG. 1, a piano 1 of the present embodiment includes a soundboard 2, a string 3, a bridge 4, and an actuator for a piano 5. The piano 1 in the present embodiment is a grand piano in which the thickness direction of the soundboard 2 is generally oriented in the vertical direction (Z-axis direction). In FIGS. 1 to 6, the X-axis direction mainly corresponds to the longitudinal direction of the string 3. Further, the Y-axis direction corresponds to the direction in which a plurality of the strings 3 are arranged.

The string 3 is stretched across an upper surface 2*a* of the soundboard 2 by being hooked on a pitch pin 61 and a tuning pin (not shown) of a frame 6 of the piano 1. A plurality of the strings 3 are arranged at an interval from each other (see FIG. 4).

Figure 2:
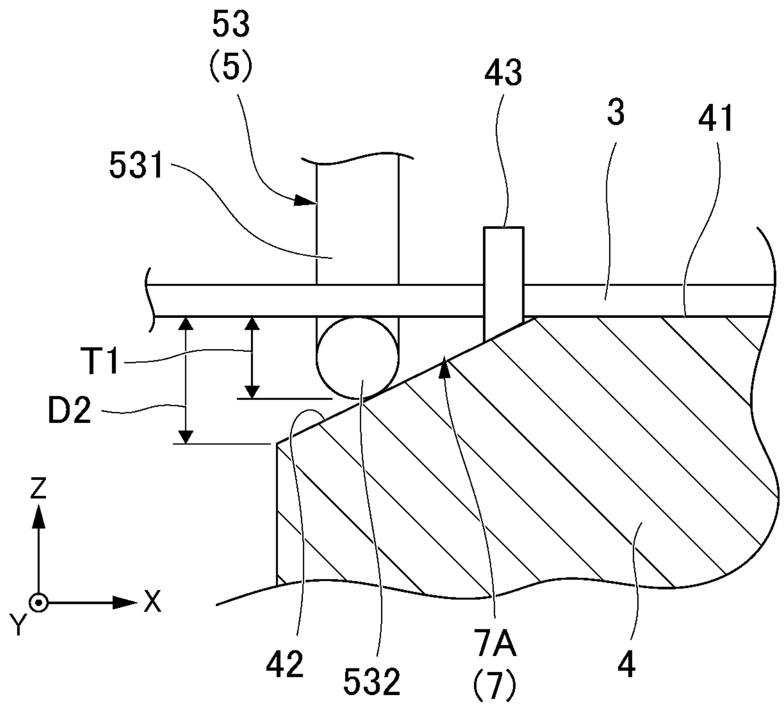
FIG. 2 is an enlarged cross-sectional view showing a state in which an attachment portion of the actuator for a piano is sandwiched between a bridge and a string in the piano of FIG. 1.

The bridge 4 is sandwiched between the upper surface 2*a* of the soundboard 2 and the string 3. As shown in FIGS. 1 and 2, the bridge 4 has an inclined surface 42 extending from a top surface 41 of the bridge 4, which is in contact with the string 3, in a direction going away from the string 3 (Z-axis negative direction) when heading in the longitudinal direction of the string 3. The inclined surface 42 is located on both sides of the top surface 41 in the longitudinal direction of the string 3. Thereby, on both sides of the top surface 41 of the bridge 4, there is a gap 7 between the bridge 4 and the string 3 in which the interval between the bridge 4 and the string 3 increases as the distance from the top surface 41 increases in the longitudinal direction of the string 3.

Figure 4:
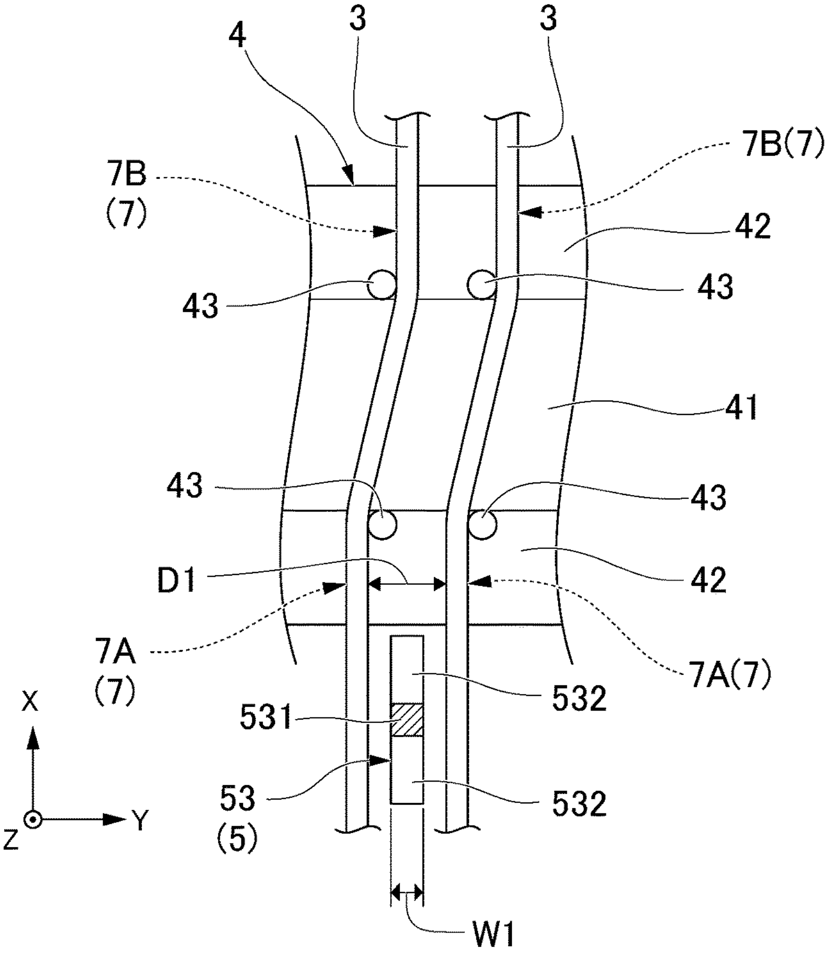
FIG. 4 is a view from above of the process for sandwiching the attachment portion of the actuator for a piano of FIG. 3 between the bridge and the string.

A bridge nail 43 for hooking the string 3 is provided at a connecting portion between the top surface 41 of the bridge 4 and each inclined surface 42. The bridge 4 is arranged at a position closer to the pitch pin 61 than the tuning pin in the longitudinal direction of the string 3. As shown in FIG. 4, the bridge 4 extends in the direction in which the plurality of strings 3 are arranged (for example, in the Y-axis direction), and supports the plurality of strings 3.

In the piano 1 of the present embodiment, when the string 3 is struck by a hammer (not shown), the string 3 vibrates mainly in the thickness direction of the soundboard 2. The vibration of the string 3 is transmitted to the soundboard 2 via the bridge 4, whereby the soundboard 2 vibrates.

Figure 3:
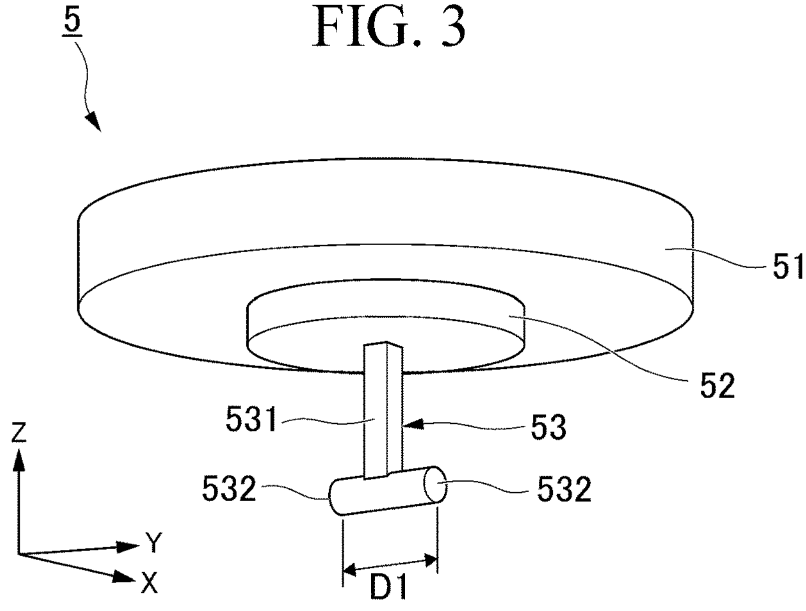
FIG. 3 is a perspective view showing the actuator for a piano shown in FIGS. 1 and 2.

The actuator for a piano 5 causes the soundboard 2 to vibrate in the thickness direction of the bridge 4 by vibrating the bridge 4 to produce a sound. As shown in FIGS. 1 and 3, the actuator for a piano 5 includes a main body (body) 51, a vibrating body 52 that vibrates in a predetermined vibration direction (for example, the Z-axis direction) with respect to the main body 51, and an attachment portion 53 provided in the vibrating body 52 and sandwiched between the bridge 4 and the string 3. The weight of the main body 51 is sufficiently heavier than the weight of the vibrating body 52 and the attachment portion 53.

The actuator for a piano 5 may be, for example, a voice coil type actuator.

The attachment portion 53 of the present embodiment has a first extension portion 531 and a second extension portion 532.

The first extension portion 531 extends from the vibrating body 52 in the vibration direction (Z-axis negative direction). Although the first extension portion 531 of the illustrated example is formed in a square columnar shape, it may be formed in an arbitrary columnar shape such as a cylindrical column, or may be formed in a plate shape, for example. Further, the first extension portion 531 may be positioned on the axis of the vibrating body 52 as shown in the illustrated example, but may also be located, for example, in a manner shifted from the axial line of the vibrating body 52.

The second extension portion 532 extends from the tip end portion of the first extension portion 531 in the extension direction in a direction intersecting the vibration direction of the vibrating body 52. The second extension portion 532 may for example extend in a direction inclined with respect to the vibration direction of the vibrating body 52. In the present embodiment, the second extension portion 532 extends in a direction orthogonal to the vibration direction of the vibrating body 52 (Y-axis direction in FIGS. 1 and 3).

The second extension portion 532 may for example extend to only one side of the tip end portion of the first extension portion 531 in a direction orthogonal to the vibration direction. That is, the attachment portion 53 may be formed in an L shape, for example. In the present embodiment, a pair of second extension portions 532 extend in opposite directions from the tip end portion of the first extension portion 531. That is, the attachment portion 53 of this embodiment is formed in a T shape. In the present embodiment, the total length L1 of the pair of second extension portions 532 is larger than the distance D1 between the two adjacent strings 3 (refer to FIG. 6).

Although the second extension portion 532 of the illustrated example is formed in a cylindrical columnar shape, it may be formed in an arbitrary columnar shape such as a square column, or may be formed in a plate shape, for example.

As shown in FIGS. 1 and 2, in the present embodiment, the second extension portion 532 of the attachment portion 53 is sandwiched between the bridge 4 and the string 3. Specifically, the second extension portion 532 is sandwiched in the above-mentioned gap 7 between the bridge 4 and the string 3. Therefore, the dimension T1 (thickness dimension T1) of the second extension portion 532 in the vibration direction of the vibrating body 52 is smaller than the maximum dimension D2 of the gap 7.

The second extension portion 532 has a dimension that is capable of being passed between two adjacent strings 3. Specifically, as shown in FIG. 4, the dimension W1 (width dimension W1) of the second extension portion 532 in a direction (Y-axis direction in FIG. 4) orthogonal to the extension direction (Z-axis direction) of the first extension portion 531 and the extension direction (X-axis direction in FIG. 4) of the second extension portion 532 is smaller than the distance D1 between the two adjacent strings 3.

In the present embodiment, the width dimension of the first extension portion 531 is also smaller than the distance D1 between the two adjacent strings 3, similarly to the width dimension W1 of the second extension portion 532. It is sufficient that at least at only the section of the first extension portion 531 that can pass between the two strings 3 (for example, the tip end portion of the first extension portion 531), the width dimension of the first extension portion 531 is smaller than the distance D1 between the two strings 3. In the attachment portion 53 illustrated in FIGS. 3 and 4, the width dimension of the first extension portion 531 is smaller than the distance D1 between the two strings 3 over the entire first extension portion 531. That is, the width dimension of the attachment portion 53 is smaller than the distance D1 between the two strings 3.

As shown in FIGS. 1 and 2, in the actuator for a piano 5, the first extension portion 531 is arranged so as to extend above the string 3 (in the positive direction of the Z axis) from the second extension portion 532 in a state of the second extension portion 532 being sandwiched in the gap 7 between the bridge 4 and the string 3. It is preferable that the extension direction (vibration direction) of the first extension portion 531 coincides with the arrangement direction (Z-axis direction) of the soundboard 2, the bridge 4, and the string 3.

As shown in FIG. 1, the actuator for a piano 5 of the present embodiment further includes a pulling portion (pulling member) 54.

The pulling portion 54 pulls in the opposite direction of the first direction (positive direction of the X axis in FIG. 1) in the state of the second extension portion 532 being arranged in the gap 7 where the interval between the bridge 4 and the string 3 increases as the second extension portion 532 heads in the first direction (the negative direction of the X axis in FIG. 1) in the longitudinal direction of the chord 3. That is, the pulling portion 54 pulls the second extension portion 532 in a direction in which the interval of the gap 7 becomes smaller. Specifically, the pulling portion 54 pulls the section of the first extension portion 531 separated from the second extension portion 532 (particularly, a section located above the string 3) in the aforementioned direction.

The pulling portion 54 of the present embodiment is an elastic body that elastically expands and contracts in a linear direction, and is passed between the first extension portion 531 and a pin that is provided on the piano 1 to hook the string 3. The pulling portion 54, which is an elastic body, may be, for example, a coil spring, but in the present embodiment is a rubber string that is easy to suppress interference with the string 3.

In the present embodiment, the pulling portion 54 is passed between the first extension portion 531 and the pitch pin 61, in the state of the second extension portion 532 being arranged in the first gap 7A positioned on the opposite side of the pitch pin 61 with respect to the top surface 41 of the bridge 4 in the longitudinal direction of the string 3. As a result, the elastic force of the pulling portion 54 can pull the second extension portion 532 in a direction in which the interval of the first gap 7A becomes smaller. By hooking the pulling portion 54 on the pitch pin 61 located near the bridge 4, the length of the pulling portion 54 can be kept short.

Next, an example of a method of sandwiching the attachment portion 53 of the actuator for a piano 5 of the present embodiment between the bridge 4 and the string 3 will be described mainly with reference to FIGS. 4 to 6.

First, as shown in FIG. 4, the actuator for a piano 5 is arranged so that the first extension portion 531 extends downward (Z-axis negative direction) from the vibrating body 52, and the extension direction of the second extension portion 532 is aligned with the longitudinal direction of the strings 3. In this state, the width direction of the second extension portion 532, whose width dimension W1 is smaller than the distance D1 between the two strings 3, is aligned with the arrangement direction (X-axis direction) of the plurality of strings 3. Thereby, the second extension portion 532 can be passed between the two adjacent strings 3 and moved downward (Z-axis negative direction) from the strings 3.

Figure 5:
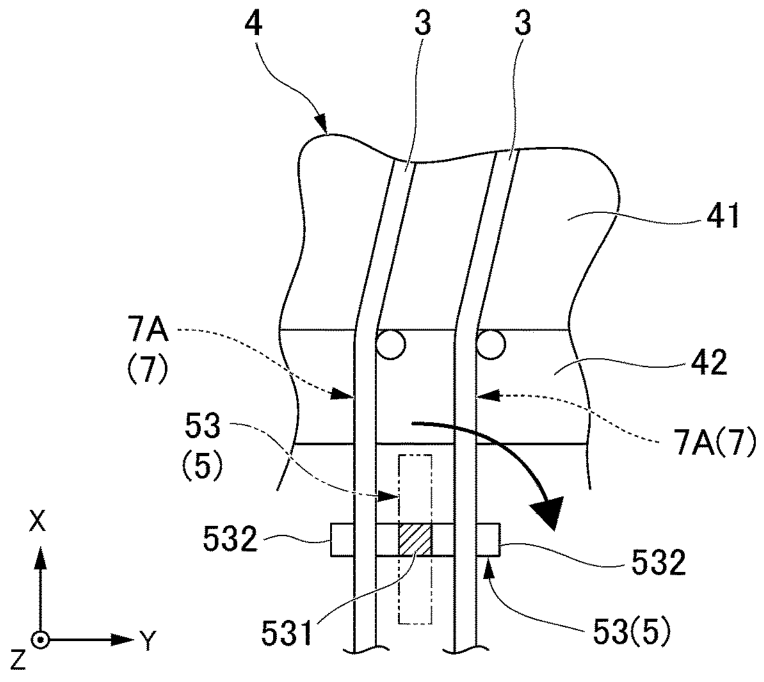
FIG. 5 is a view from above of the process for sandwiching the attachment portion of the actuator for a piano of FIG. 3 between the bridge and the string.

Next, as shown in FIG. 5, the attachment portion 53 is rotated 90 degrees, with the extension direction of the first extension portion 531 serving as the axis. As a result, the pair of second extension portions 532 are located below the strings 3, respectively.

Figure 6:
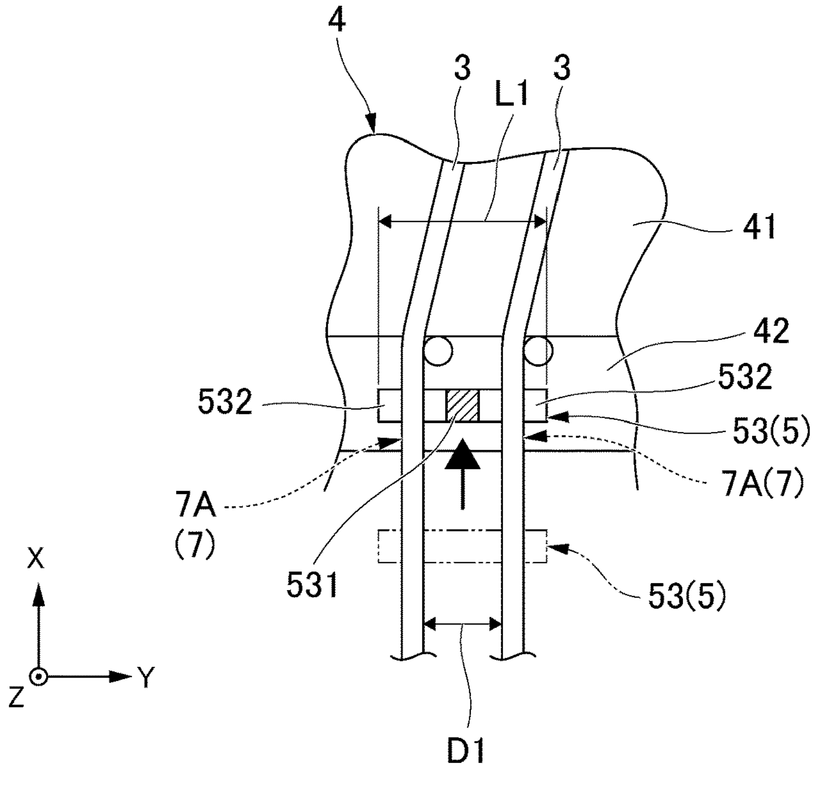
FIG. 6 is a view from above of the process for sandwiching the attachment portion of the actuator for a piano of FIG. 3 between the bridge and the string.

Finally, as shown in FIG. 6, the pair of second extension portions 532 are inserted in the gap 7 (first gap 7A) between each string 3 and the inclined surface 42 of the bridge 4. As a result, the second extension portion 532 can be sandwiched between the string 3 and the bridge 4.

As shown in FIGS. 1 and 2, when the attachment portion 53 of the actuator for a piano 5 is sandwiched between the bridge 4 and the string 3, the attachment portion 53 (particularly the second extension portion 532) is pressed against the bridge 4. Therefore, the bridge 4 can be vibrated by the actuator for a piano 5. The vibration of the bridge 4 is transmitted to the soundboard 2, so that the soundboard 2 vibrates. In the piano 1 of the present embodiment in which the actuator for a piano 5 vibrates the bridge 4, compared with the case where the actuator for a piano 5 directly vibrates the soundboard 2, since the sound production structure by the actuator for a piano 5 is similar to the sound production structure of a normal piano that vibrates a bridge by vibration of the strings, a more piano-like sound can be produced. In particular, since the vibration direction of the vibrating body 52 (extension direction of the first extension portion 531) is the same as the main vibration direction of the strings 3, the sound production structure by the actuator for a piano 5 can further approach the sound production structure arising from vibration of the strings.

As described above, according to the actuator for a piano 5 of the present embodiment, the actuator for a piano 5 can be easily attached to the piano 1 by simply sandwiching the attachment portion 53 between the bridge 4 and the strings 3. Therefore, the actuator for a piano 5 can be attached to the piano 1 without performing processing on the piano 1 or adhering the actuator for a piano 5 to the piano 1. Further, the actuator for a piano 5 can be easily removed from the piano 1 by simply removing the attachment portion 53 from between the bridge 4 and the strings 3 of the piano 1.

That is, the actuator for a piano 5 can be easily attached to and detached from the piano 1 without performing any processing and without using an adhesive.

Further, the attachment portion 53 of the actuator for a piano 5 of the present embodiment has a first extension portion 531 extending in the vibration direction from the vibrating body 52 and a second extension portion 532 extending in a direction intersecting the vibration direction from the tip end portion of the first extension portion 531 and sandwiched between the bridge 4 and the string 3. Therefore, in the state of the second extension portion 532 being sandwiched between the bridge 4 and the string 3, the first extension portion 531 can be extended in the direction in which the bridge 4 and the string 3 are aligned (the arrangement direction of the bridge 4 and the string 3). Thereby, the main body 51 and the vibrating body 52 can be arranged at positions away from the string 3 in the arrangement direction of the bridge 4 and the string 3. Accordingly, it is possible to prevent the main body 51 and the vibrating body 52 of the actuator for a piano 5 from interfering with the string 3 and the bridge 4.

In the actuator for a piano 5 of the present embodiment, the pair of second extension portions 532 extend in opposite directions from the tip portion of the first extension portion 531. As a result, the pair of second extension portions 532 can be sandwiched between the bridge 4 and two strings 3. Therefore, compared with the case where one second extension portion 532 is sandwiched between the bridge 4 and one string 3, the force pressing the second extension portion 532 against the bridge 4 is increased by the tension of the strings 3. Accordingly, the second extension portion 532 can be held more firmly against the bridge 4.

Further, since the first extension portion 531 is located between the pair of second extension portions 532 sandwiched between the bridge 4 and the strings 3, the actuator for a piano 5 can be stably attached to the piano 1.

In the actuator for a piano 5 of the present embodiment, the thickness dimension T1 of the second extension portion 532 sandwiched in the gap 7 (for example, the first gap 7A) between the bridge 4 and the string 3 is smaller than the maximum dimension D2 of the gap 7, where the interval between the bridge 4 and the string 3 gradually increases heading in the first direction (for example, the negative direction of the X axis) in the longitudinal direction of the strings 3. Thereby, the second extension portion 532 can be easily and surely inserted into the gap 7 between the bridge 4 and the string 3. As a result, the second extension portion 532 can be easily and surely sandwiched between the bridge 4 and the string 3.

The actuator for a piano 5 of the present embodiment includes the pulling portion 54 that pulls the second extension portion 532 in the opposite direction of the first direction (for example, positive direction of the X axis) in the state of the second extension portion 532 being arranged in the gap 7 between the bridge 4 and the string 3. Therefore, the second extension portion 532 is pulled by the pulling portion 54 in the direction in which the interval in the gap 7 between the bridge 4 and the string 3 becomes smaller. Thereby, the second extension portion 532 can be held in a state of being sandwiched between the bridge 4 and the string 3, that is, the second extension portion 532 can be prevented from coining out of the gap 7 between the bridge 4 and the string 3.

In the actuator for a piano 5 of the present embodiment, the pulling portion 54 pulls the section of the first extension portion 531 separated from the second extension portion 532 in the opposite direction (X-axis positive direction). Therefore, it is possible to prevent the actuator for a piano 5 from rotating (swinging) with respect to the piano 1 about the extension direction of the second extension portion 532. In particular, when viewed from the direction shown in FIG. 1, it is possible to suppress counterclockwise rotation of the actuator for a piano 5. As a result, the actuator for a piano 5 can be stably attached to the piano 1. That is, the actuator for a piano 5 can be held at a predetermined position without fixing the main body 51 of the actuator for a piano 5 to the housing of the piano 1 (for example, the frame 6, a side plate, a support, or the like). By eliminating the need to fix the main body 51 of the actuator for a piano 5 to the housing of the piano 1, the actuator for a piano 5 can be attached and detached more easily.

Further, the actuator for a piano 5 of the present embodiment has a dimension (width dimension W1) that allows the second extension portion 532 to pass between two adjacent strings 3. As a result, as shown in FIGS. 4 to 6, after passing the second extension portion 532 between two strings 3, by rotating the attachment portion 53 90 degrees with the extension direction of the first extension portion 531 serving as the axis, the second extension portion 532 can be easily inserted into the gap 7 between the bridge 4 and the string 3.

In the actuator for a piano 5 of the present embodiment, the second extension portion 532 is formed in a cylindrical columnar shape. In a state where the second extension portion 532 is sandwiched between the bridge 4 and the string 3, the outer peripheral surface of the second extension portion 532 comes into contact with the bridge 4 and the string 3. Therefore, compared with the case where the second extension portion 532 is formed in a square columnar shape, it is possible to prevent the bridge 4 and the string 3 from being damaged by the second extension portion 532.

Although the present disclosure has been described in detail above, the present disclosure is not limited to the above embodiment, and various modifications can be made in a range that does not depart from the spirit of the present disclosure.

Figure 7:
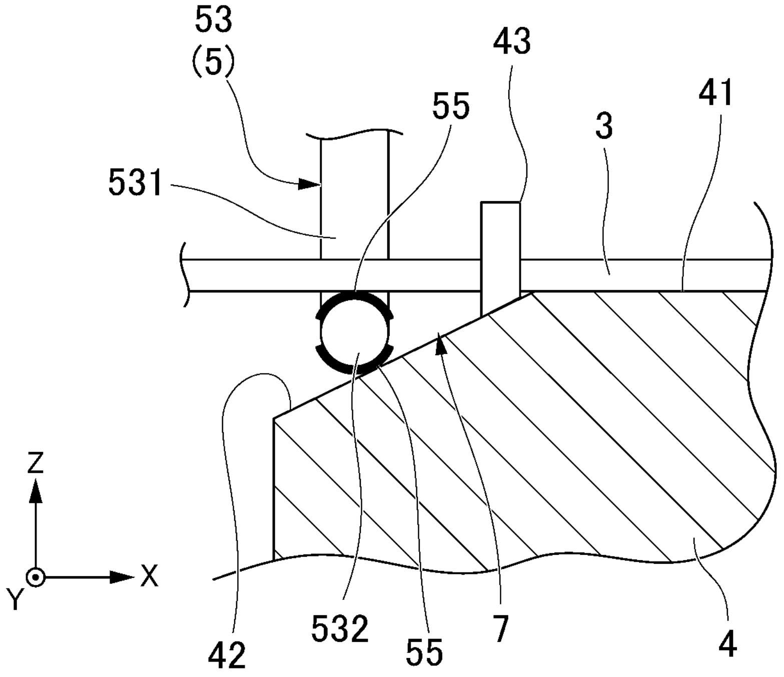
FIG. 7 is an enlarged cross-sectional view showing a state in which an attachment portion of an actuator for a piano according to another embodiment of the present disclosure is sandwiched between the bridge and the string of the piano.

In the present disclosure, the actuator for a piano 5 may include a cushioning material 55 that covers the surfaces of the attachment portion 53 facing the bridge 4 and the string 3, as shown in FIG. 7, for example. In FIG. 7, the cushioning material 55 covers the outer peripheral surface of the second extension portion 532 facing the bridge 4 and the string 3. The cushioning material 55 may be made of a material that is softer and more easily deformable than the bridge 4 and the string 3, such as felt or rubber.

By interposing the cushioning material 55 between the attachment portion 53 and the bridge 4 or the string 3, it is possible to prevent the bridge 4 or the string 3 from being damaged by the attachment portion 53 coming into contact with the bridge 4 or the string 3. That is, the bridge 4 and the string 3 can be protected.

In the present disclosure, the pulling portion 54 is not limited to being passed between the first extension portion 531 and the pitch pin 61, and may, for example, be passed between the first extension portion 531 and the tuning pin or the bridge nail 43. For example, in the above embodiment, when the second extension portion 532 of the actuator for a piano 5 is arranged in the second gap 7B (see FIG. 1) located on the pitch pin 61 side with respect to the top surface 41 of the bridge 4 in the longitudinal direction of the string 3, the pulling portion 54 may be passed between the first extension portion 531 and the tuning pin.

In the present disclosure, the main body 51 of the actuator for a piano 5 may be fixed to, for example, the housing of the piano 1.

In the present disclosure, the same (single) piano 1 may be provided with a plurality of the actuators for a piano 5. In this case, the actuators for a piano 5 may be provided for, for example, a plurality of strings 3 having mutually different sound ranges. The actuators for a piano 5 may be provided for each string 3 corresponding to, for example, a low range, a mid-range, and a high range. Further, the actuators for a piano 5 may be provided on, for example, a long bridge and a short bridge of the piano 1, respectively. Alternatively, the plurality of actuators for a piano 5 may be provided at mutually different positions in the longitudinal direction of the bridge 4 with respect to the same (single) bridge 4.

When the actuators for a piano 5 are provided in mutually different sound ranges of the piano 1, each actuator for a piano 5 may vibrate the bridge 4 on the basis of a drive signal with a characteristic corresponding to the respective sound range.

For example, the piano of the present disclosure may include an actuator for a piano that directly vibrates the soundboard 2 in addition to the actuator for a piano 5 that vibrates the bridge 4.

The actuator for a piano of the present disclosure is not limited to a grand piano, and may also be applied to, for example, an upright piano in which the thickness direction of the soundboard 2 faces substantially the horizontal direction.

According to the present disclosure, the actuator for a piano can be easily attached to and detached from a piano without any processing and without using an adhesive.

What is claimed is:

1. An actuator for a piano comprising a bridge and strings, the actuator comprising:
- a vibrating body; and
- an attachment portion configured to attach the vibrating body to the piano, part of the attachment portion being configured to be sandwiched between the bridge and at least one string, among the strings of the piano.

2. The actuator according to claim 1, further comprising:
- a main body,
- wherein the vibrating body vibrates in a predetermined vibration direction with respect to the main body,
- wherein the attachment portion comprises:
  - a first extension portion that extends from the vibrating body in the vibration direction; and
  - a second extension portion that extends from an end portion of the first extension portion in a direction intersecting the vibration direction, and
- wherein the second extension portion is the part of the attachment portion that is configured to be sandwiched between the bridge and the one string.

3. The actuator according to claim 2, wherein the second extension portion extends outwardly in mutually opposite directions from the end portion of the first extension portion.

4. The actuator according to claim 2, wherein:
- the second extension portion is configured to be sandwiched in a gap between the bridge and the one string, the gap between the bridge and the one string increasing toward a first direction along a lengthwise direction of the one string, and
- the actuator further comprises a pulling member that pulls in an opposite direction to the first direction, in a state where the second extension portion is arranged in the gap.

5. The actuator according to claim 2, wherein:
- the second extension portion is configured to be sandwiched in a gap between the bridge and the one string, the gap between the bridge and the one string increasing toward a first direction along a lengthwise direction of the one string, and
- a dimension of the second extension portion in the vibration direction is smaller than a maximum dimension of the gap.

6. The actuator according to claim 2, wherein the second extension is dimensioned to pass between two adjacent strings including the one string, among the strings.

7. The actuator according to claim 1, further comprising:
- a cushioning material covering a surface of the attachment portion, the surface being configured to face the bridge and the one string.

8. A piano comprising:
a bridge;
strings; and
an actuator comprising:
a vibrating body; and
an attachment portion that attaches the vibrating body to the piano, part of the attachment portion being sandwiched between the bridge and at least one string, among the strings.

9. The piano according to claim 8, wherein:
the actuator further comprises a main body,
the vibrating body vibrates in a predetermined vibration direction with respect to the main body, and
the attachment portion comprises:
a first extension portion that extends from the vibrating body in the vibration direction; and
a second extension portion that extends from an end portion of the first extension portion in a direction intersecting the vibration direction, and
wherein the second extension portion is the part of the attachment portion that is sandwiched between the bridge and the one string.

10. The piano according to claim 9, wherein the second extension portion extends outwardly in mutually opposite directions from the end portion of the first extension portion.

11. The piano according to claim 9, wherein:
the second extension portion is sandwiched in a gap between the bridge and the one string, the gap between the bridge and the one string increasing toward a first direction along a lengthwise direction of the one string, and
the actuator further comprises a pulling member that pulls in an opposite direction to the first direction, in a state where the second extension portion is arranged in the gap.

12. The piano according to claim 9, wherein:
the second extension portion is sandwiched in a gap between the bridge and the one string, the gap between the bridge and the one string increasing toward a first direction along a lengthwise direction of the one string, and
a dimension of the second extension portion in the vibration direction is smaller than a maximum dimension of the gap.

13. The piano according to claim 9, wherein the second extension portion is dimensioned to pass between two adjacent strings including the one string, among the strings.

14. The piano according to claim 8, further comprising:
a cushioning material covering a surface of the attachment portion, the surface facing the bridge and the string.

* * * * *